United States Patent
Bradford et al.

[11] Patent Number: 5,961,070
[45] Date of Patent: Oct. 5, 1999

[54] AERIAL CHAIN SAW

[76] Inventors: Jeffrey C. Bradford, 327 N. 500 West, Santaquin; Craig F. Huntington, 221 W. 185 South, Orem, both of Utah 84055

[21] Appl. No.: 09/017,688

[22] Filed: Feb. 3, 1998

Related U.S. Application Data

[60] Provisional application No. 60/037,230, Feb. 3, 1997.

[51] Int. Cl.⁶ .................................................. B64D 47/00
[52] U.S. Cl. ............................... 244/118.1; 56/8; 144/335
[58] Field of Search .................... 244/118.1; 144/335, 144/4.1; 56/8, 330, 336

[56] References Cited

U.S. PATENT DOCUMENTS

| | | | |
|---|---|---|---|
| 1,342,213 | 6/1920 | Hanson et al. . | |
| 2,707,008 | 4/1955 | Bannister . | |
| 4,341,017 | 7/1982 | Janczak . | |
| 4,554,781 | 11/1985 | Rogers . | |
| 4,644,654 | 2/1987 | Howe et al. . | |
| 4,662,414 | 5/1987 | Fandrich | 144/335 |
| 4,713,929 | 12/1987 | Smith | 56/8 |
| 4,815,263 | 3/1989 | Hartung et al. . | |
| 4,984,757 | 1/1991 | Hartung et al. . | |
| 5,190,250 | 3/1993 | De Long | 244/118.1 |

FOREIGN PATENT DOCUMENTS

| | | |
|---|---|---|
| 729953 | 3/1966 | Canada . |
| 2021812 | 1/1992 | Canada . |

*Primary Examiner*—Galen L. Barefoot
*Attorney, Agent, or Firm*—Richard C. Litman

[57] ABSTRACT

An aerial chain saw suspended from a helicopter by a non-rigid suspension system. A continuous chain extends around a chain saw bar, driven by a sprocket. Hydraulic lines to and from the helicopter provide hydraulic power to a hydraulic motor mounted at the upper end of the bar. In addition to the motor, a landing foot is mounted to the upper end of the bar. When the saw is landed, the helicopter slowly lowers the saw to the ground, a lower chain guard protects the lower of the saw, and the landing foot, positioned at right angles to the bar, protects the upper end of the saw. The non-rigid suspension system is made of non-twist material for keeping the cutting direction aligned with the nose of the aircraft. The suspension system is also non-conductive to electrically insulate the aircraft from the chain saw. The non-rigid nature of the suspension system aids landing and dampens vibrational forces transmitted from the chain saw.

11 Claims, 5 Drawing Sheets

AERIAL CHAIN SAW

CROSS-REFERENCE TO RELATED APPLICATION

This application claims the benefit of U.S. Provisional patent application Ser. No. 60/037,230, filed Feb. 3, 1997.

BACKGROUND OF THE INVENTION

1. Field of the Invention

The present invention relates to a chain saw carried by a helicopter to remove tree limbs.

2. Description of Prior Art

Aerial saws for use in forestry are known. The prior art fails to show, however, a hydraulically powered chain saw that is suspended from a helicopter by a non-twist, non-rigid suspension system that is also non-conductive, as taught by the present invention. The use of a chain saw reduces vibrations that can be caused by multiple saw blades as branches are bounced between the blades, while reducing the number of uncut branches. The non-twist suspension system maintains the saw's cutting direction in line with the helicopter's nose, while allowing flexibility to reduce the transmission of vibration to the helicopter.

U.S. Pat. No. 2,707,008, (Bannister) discloses an aerial saw suspended from a helicopter via a cable. U.S. Pat. No. 4,341,017, (Janczak) discloses a hydraulically powered chain saw.

U.S. Pat. No. 4,554,781, (Rogers, deceased) discloses an aerial saw that is suspended from a helicopter on a boom, is powered hydraulically and has a saw landing assist foot. U.S. Pat. No. 4,644,654, (Howe et al.) discloses a powered saw suspended by an elongated flexible means. U.S. Pat. No. 4,815,263, (Hartung et al.) discloses an aerial saw having a number of circular blades and suspended from a helicopter using a boom. U.S. Pat. No. 4,984,757, (Hartung et al.) discloses a trapeze mount for a boom of a helicopter-borne saw. U.S. Pat. No. 5,107,592, (Downey et al.) discloses an overhead suspended tree trimming saw. Canadian Patent No. 729,953 discloses a boom carried chain saw. Canadian Patent No. 2,021,812 discloses a hydraulically operated, helicopter borne, tree trimming saw.

None of the above inventions and patents, taken either singularly or in combination, is seen to describe the instant invention as claimed. Thus an aerial chain saw solving the aforementioned problems is desired.

SUMMARY OF THE INVENTION

The present invention is an aerial chain saw. A continuous chain extends around a sprocket rotatably mounted to an upper end of a chain saw bar. The chain is driven around the periphery of the chain saw bar. The links of the chain have a teeth mounted thereto to form a chain for cutting. The sprocket attached to the upper end of the chain saw bar is driven by hydraulic motor via a drive shaft. Non-conductive hydraulic lines to and from the helicopter provide hydraulic power to the hydraulic motor. Non-conductive hydraulic fluid is also used to ensure electrical insulation of the chain saw from the helicopter. The hydraulic power may be provided by the helicopter's hydraulic system, or the chain saw may include a self contained hydraulic system with a dedicated hydraulic pump, to alleviate legal and regulatory aviation concerns. The hydraulic motor drives a shaft which in turn drives the sprocket and a flywheel attached to the sprocket. The flywheel provides a means of storing inertial energy, while maintaining chain stability. When the saw is landed, the helicopter slowly lowers the saw to the ground, a chain guard protects the lower end of the saw, and a landing foot extending at an approximate right angle to the bar, to protect the upper end of the saw.

The chain saw is suspended and electrically insulated from a helicopter by a saw support system that includes a non-twist, non rigid link system. The link system includes round fiberglass shafts with machined aluminum fittings as a means of attachment at both ends of each shaft. The link system is constructed with closely machined links, to avoid rotation of one link relative to the adjoining links.

The link system has end connections that provide a means of attaching the links to the saw as well as the helicopter's belly hook. A conventional belly hook has a load beam for supporting devices that are latched onto the belly hook. The belly hook used with the present invention is equipped with a machined (or cast), load beam that is tolerance-fit to a machined clevis that is attached to the upper end of the link system. This tolerance-fit allows the link system to be connected and disconnected to the belly hook in the normal fashion, but inhibits any rotational motion about the link system's vertical axis. Two fiberglass shafts are joined forming a knuckle or hinge whereby the link system may bend or flex to ease landing and to reduce vibration transmitted to the helicopter. The lower end of the link system also includes a machined fitting, that attaches to two lift plates that are attached to the chain saw bar. As in the upper link connection, the lower connection is tolerance-fit to inhibit any rotational motion about the link system's vertical axis. The link system connections maintain the saw's cutting direction in line with the nose of the helicopter.

A gravity fed lubrication system provides lubricating oil for the saw chain. A lubricating jet is mounted between the lift plates and directed toward the saw chain. Attached to the link system at a point near the belly hook is a lubrication reservoir. The lubrication reservoir has a screw threaded cap on top to provide a means for adding lubrication. A lubrication line extends from the lubrication reservoir to the jet, and the lubrication is thereby gravity fed.

Accordingly, it is a principal object of the invention to provide a means to trim tree limbs at heights or remote areas.

It is another object of the invention to non-conductively insulate the saw from the helicopter.

It is another object of the invention to reduce the vibrations inherent to multiple blade saws by providing an aerial saw with a single cutting means, (chain saw).

It is a further object of the invention to reduce vibrations imparted to a helicopter, while still maintaining the correct saw cutting direction.

Still another object of the invention is to provide an easy method for landing an aerial saw to avoid the saw being damaged by the ground.

Yet another object of the invention is to reduce the number of uncut branches.

It is an object of the invention to provide improved elements and arrangements thereof in an aerial chain saw for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
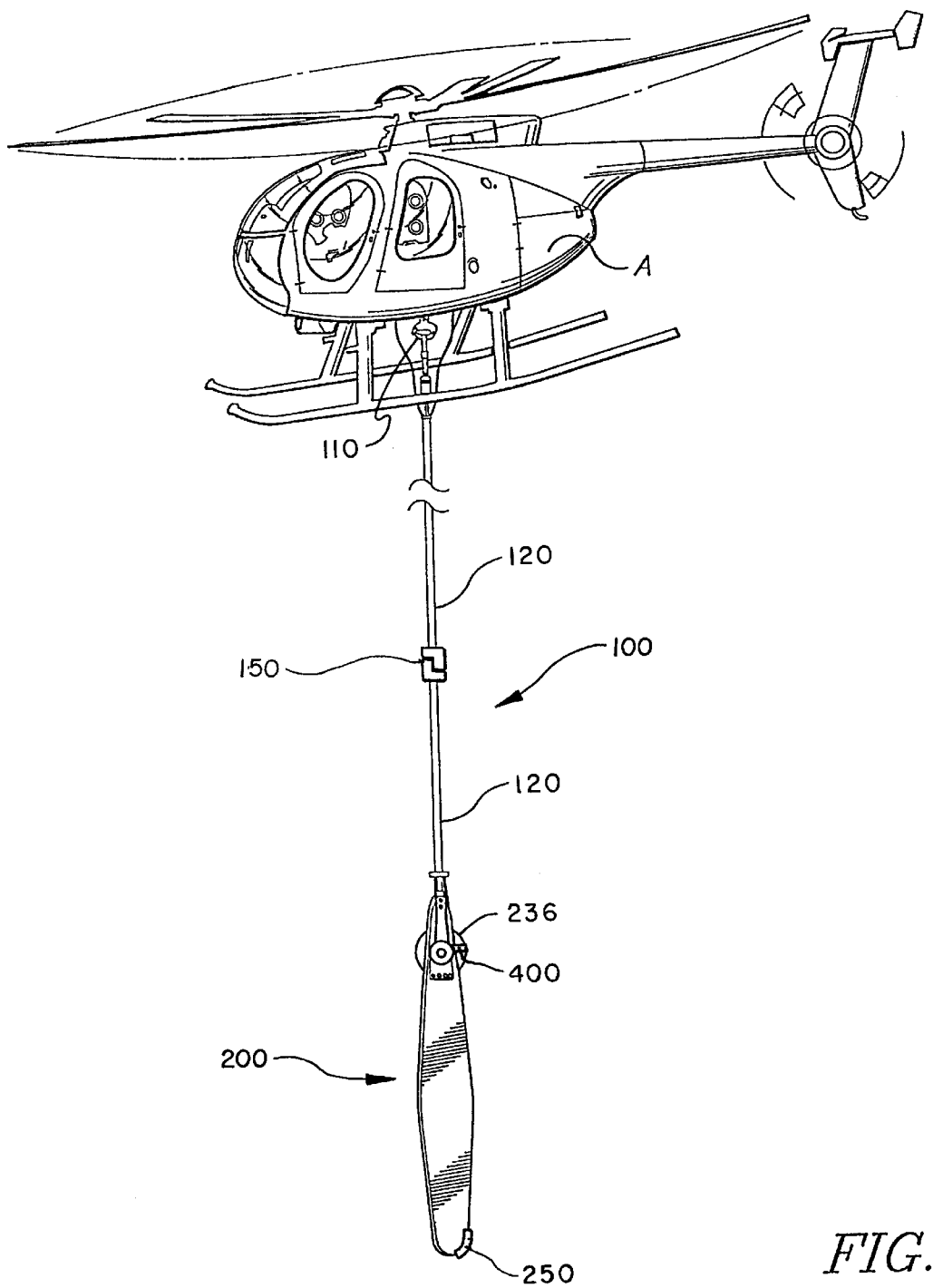
FIG. 1 is an environmental, perspective view of a aerial chain saw according to the present invention being carried by a helicopter.

The present invention is an aerial chain saw system for use with a helicopter as generally shown in FIG. 1. In a preferred embodiment, the chain saw system includes a chain saw 200, a non-rigid suspension system 100, and a lubrication system.

Figure 6:
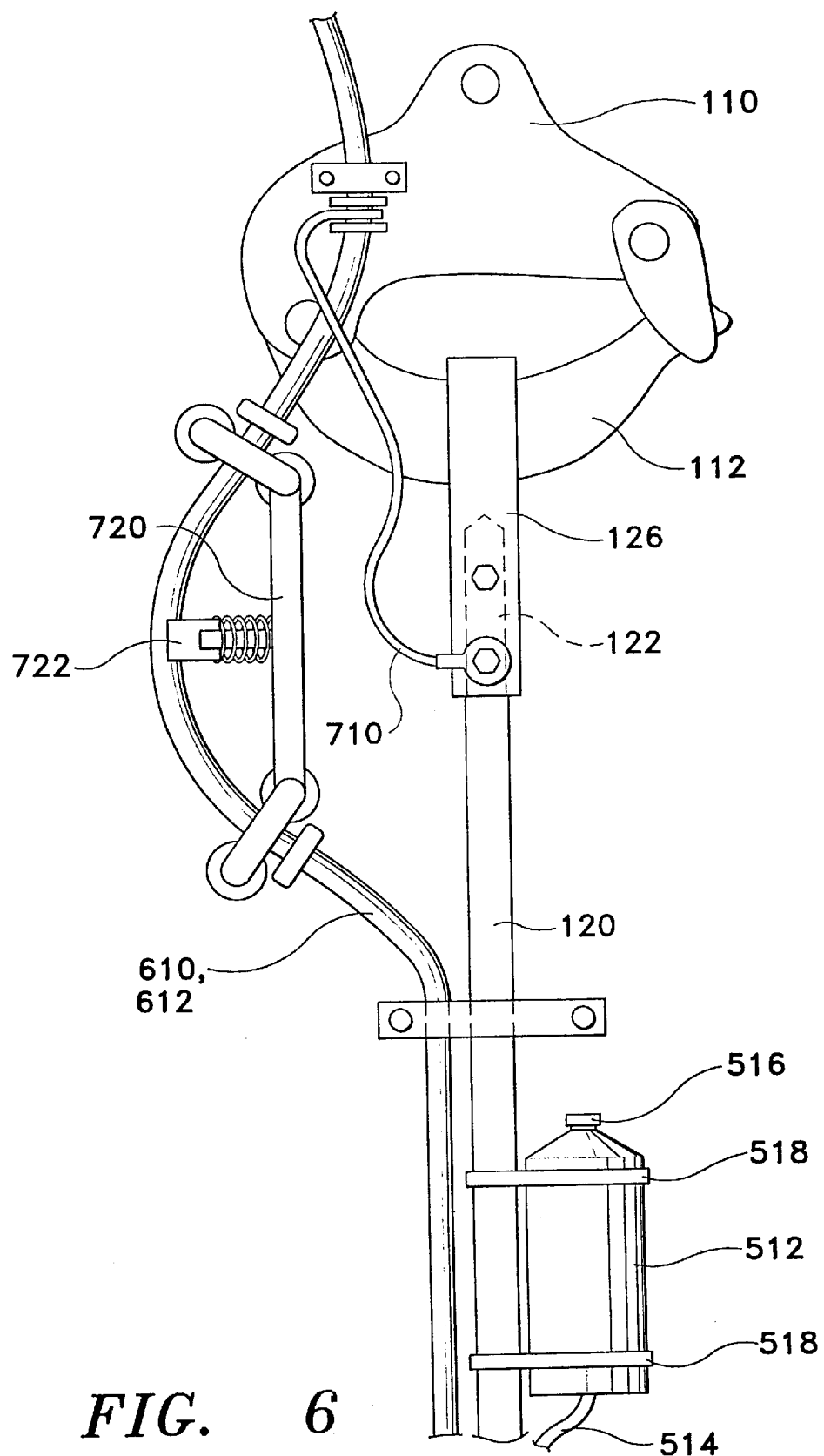
FIG. 6 is an elevation view of non-rigid suspension means and emergency jettison apparatus.

The non-rigid suspension system 100 is used to attach the chain saw 200 to the helicopter A. This system begins with a standard belly hook 110 which is attached to the underside of the helicopter. As best shown in FIG. 6, the belly hook 110, however, has a non-conventional machined load beam 112 capable of supporting the load of the chain saw system. A primary part of the suspension system is a non-twist member. The non-twist member is made up of two fiberglass shafts 120 joined by a machined aluminum knuckle 150. The knuckle 150 acts as a bidirectional hinge connecting the two shafts 120. In this manner, multiple links may be added to the suspension system. The non-twist member maintains the chain saw 200 in a forward cutting position, while providing freedom of movement in that direction to reduce the vibrations transmitted to the helicopter A.

Figure 5:
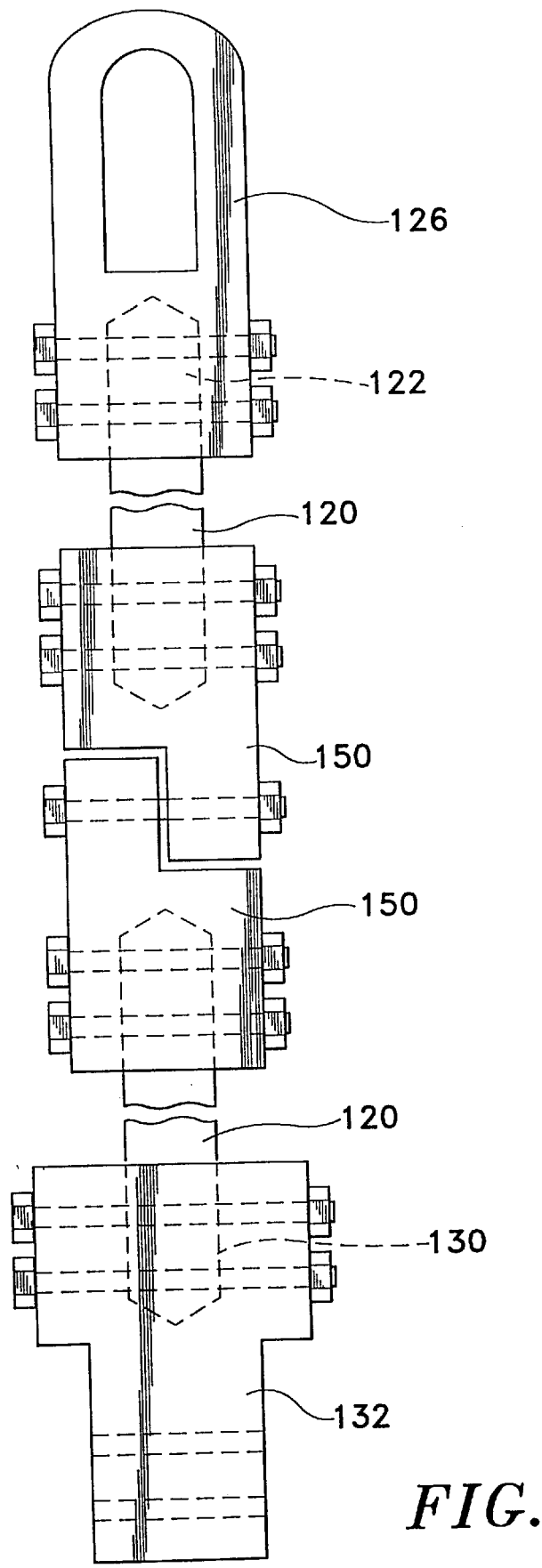
FIG. 5 is an elevational view of non-rigid suspension means with a knuckle link.

With reference to FIG. 5, the non-twist member has a first end 122 and a second end 130. A first end piece 126 is attached to the first end 122 of the non-twist member 120. The first end piece 126 is machined to define an aperture tolerance-fit to accept the load beam 112 of the belly hook 110. This tolerance-fit inhibits rotation about the vertical axis, while still allowing the non-twist member to be released from the belly hook 110. A second end piece 132, is attached to a second end 130 of the non-twist member. This second end piece 132 is eventually used to attach the chain saw 200 to the suspension system.

The knuckle link 150 and first and second end pieces 126, 132 are preferably made of machined aluminum block. The end pieces are each designed for their specific task of connecting respective ends of the non-twist member to the aircraft and the chainsaw. The knuckle link 150 is designed as two mated parts, which attach to the ends of the fiberglass shafts, and are then mated to one another creating a hinge. Each attachment is made with at least one bolt fastener.

Figure 2:
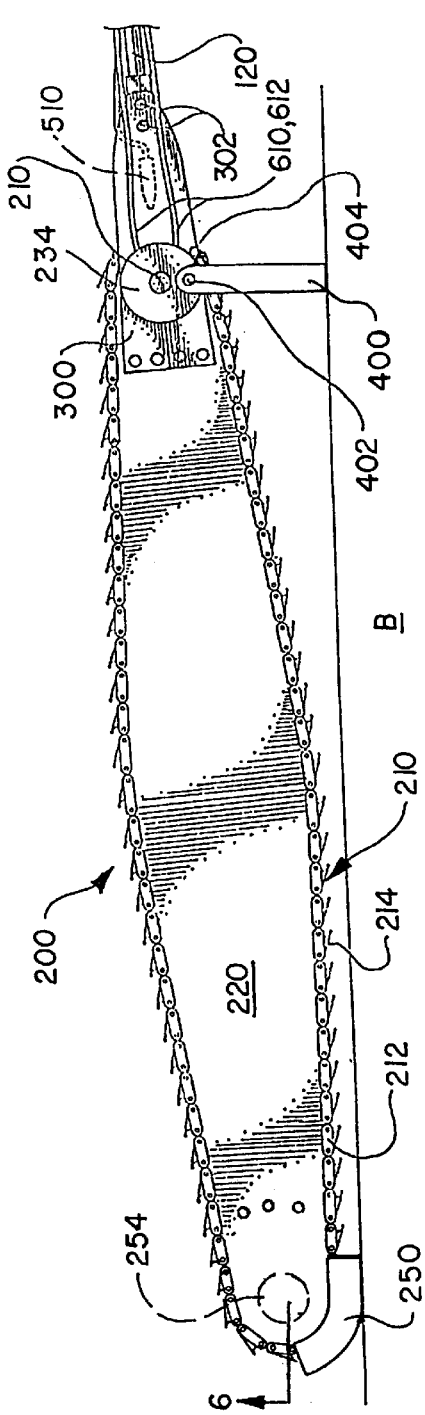
FIG. 2 is a side elevational view of the aerial chain saw resting on the ground.
Figure 3:
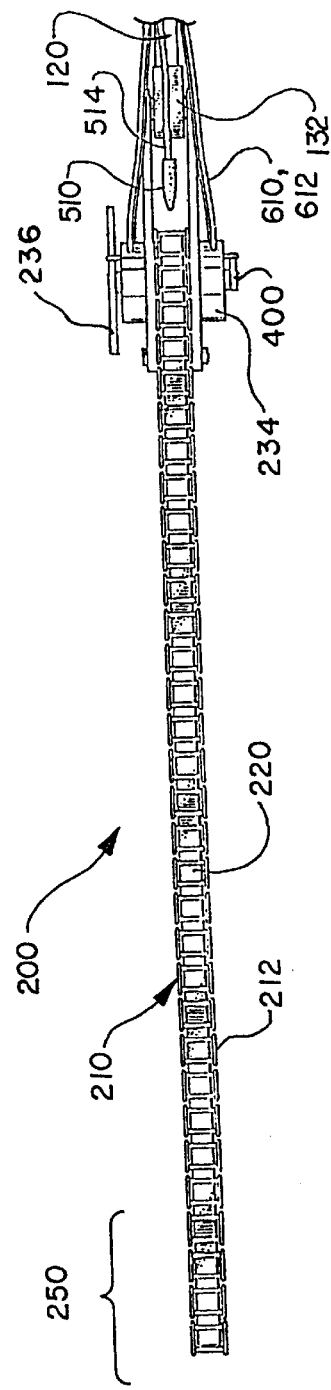
FIG. 3 is a top plan view of the aerial chain saw of FIG. 2.
Figure 4:
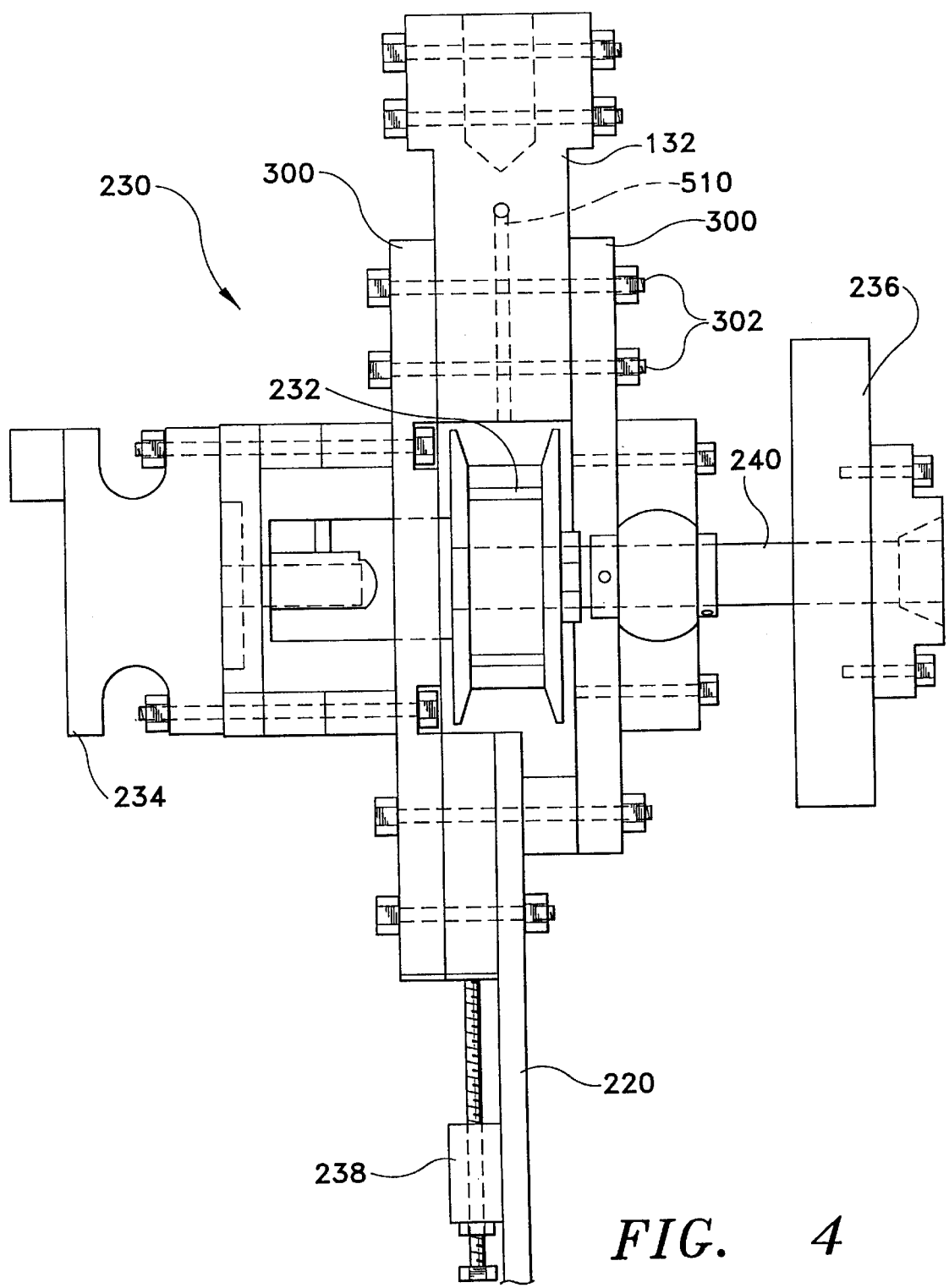
FIG. 4 is a partial cross section of the upper drive assembly.

Referring to FIGS. 2, 3, and 4, the chain saw 200 is made up of a singular cutting means, a guide bar 220, a drive assembly 230, a chain guard 250, and a connection assembly for attachment to the suspension system. The singular cutting means is made up of a continuous chain 210 having a plurality of links 212. Teeth 214, extending outwardly to engage and cut tree limbs, are attached to the links 212 of the chain 210. The chain 210 is driven about the periphery of a guide bar 220.

A drive assembly 230 powers the chain 210. A sprocket 232 is mounted at a first end of the guide bar 220. This sprocket 232 engages and drives the chain 210 about the periphery of the guide bar 220. The sprocket 232 is driven by at least one hydraulic motor 234 which turns a drive shaft 240. A combination of at least one hydraulic motor 234 and at least one flywheel assembly 236 is used as shown in FIG. 4. The drive assembly 230 is also provided with a chain tension adjusting means 238, as is well known in the chain saw art.

A hydraulic system cycles non-conductive hydraulic fluid through a supply line 610 to the hydraulic motor 234 and back through a return line 612 to a hydraulic fluid pressure source (not shown). The hydraulic fluid pressure source may be either an integral part of the helicopter or a separate element carried by the helicopter. Non-conductive hydraulic fluid is used to ensure that the helicopter is electrically insulated from the helicopter.

At a second, opposite, end of the guide bar 220 is a chain guard 250. The guard mounts to the second, lower, end of the saw bar to protect the chain saw from damage while landing the saw.

The connection assembly for affixing the chain saw 200 to the suspension system 100 includes two lift plates 300 and associated connecting pins 302. The lift plates 300 may be attached to the drive assembly 230 of the chain saw 200. A distal end of the lift plates 300 includes at least one, preferably two, pins 302 for attaching the second end piece 132 of the non-twist member 120 to the plates 300. The pins 302 are secured after passing through the lift plates 300 and the aperture of the second end piece 132.

A chain lubricating system, as best shown in FIG. 6, includes a lubricant spray nozzle or passage 510, lubricant reservoir 512, and a supply line 514. The lubrication reservoir 512, with a threadably attached cap 516, is attached to the non-twist member 120 using two straps 518. Lubrication supply line 514 extends from the bottom of the reservoir 512 to the oil spray nozzle 510, mounted above the drive assembly 230 between the lift plates 300. In this manner, lubricant is gravity fed to the saw chain 210.

To prevent damage to the saw 200 when landing, a landing foot 400 is provided to support the saw above a landing surface B, as shown in FIG. 2. The landing foot is attached to the drive assembly at approximately a right angle to the saw by a pin 402. To land the saw, the hydraulic motor is turned off, stopping chain movement, while the helicopter A slowly reduces altitude until the chain guard 250 touches the ground B. As the helicopter A continues to lower the saw, it moves horizontally to allow the top of the saw 200 to approach the ground with the landing foot 400 on the bottom. When the saw moves toward the horizontal, the landing foot 400 and flywheel 236 of the drive assembly support the saw above the ground B. It should be noted that the radius of the flywheel and the length of the landing foot 400 must be at least as large as the distance from drive shaft 240 to the ground B in FIG. 2, to support the saw chain 210 off of the ground.

In the event that the pilot of the helicopter may need to jettison the chain saw, measures are provided for detaching or severing the hydraulic lines, as shown in FIG. 6. A lanyard 710 may be used to disengage the lines at a junction point. Disengagement occurs when the load beam 112 of the belly hook 110 is lowered to release the chain saw 200 and suspension system 100. The weight of the now freed chain saw pulls the lanyard 710 to disengage the lines. A guillotine assembly 720 may be used alternatively, or as a safety backup measure. Once again the weight of the detached chain saw system is used to separate the hydraulic lines.

When the lines pull taut under this weight, the lines straighten causing a blade 722 mounted on the lines to cut through the lines, thereby severing the lines allowing the chain saw system to fall to the ground, freeing the helicopter.

It is to be understood that the present invention is not limited to the embodiments described above, but encompasses any and all embodiments within the scope of the following claims.

We claim:

1. An aerial chain saw system comprising:
   a chain saw comprising:
      a singular cutting means comprising a continuous chain having teeth mounted thereto;
      a bar for guiding said chain about a periphery of said bar;
      a drive assembly for driving said chain about said periphery of said bar, said drive assembly comprising:
         a sprocket mounted at a first end of said bar for driving said chain about said periphery of said bar;
         at least one hydraulic motor for driving said first sprocket; and
         a flywheel assembly for storing inertial energy and stabilizing said chain; and
   a non-rigid suspension means for attaching said chain saw to an aircraft and dampening vibrations caused by said chain saw, wherein said chain saw is attached to said non-rigid suspension means by two lift plates attached to said first end of said bar of said saw and to a first end of said non-rigid suspension means, wherein said lift plates have at least one pin extending through at least one aperture in said end of said non-rigid suspension means.

2. The aerial chain saw system as defined in claim 1 further comprising a lubrication system including:
   a lubricating jet mounted above said drive assembly for applying a lubricating fluid to said chain;
   a lubricating fluid reservoir mounted on said suspension means above said chain saw; and
   a lubricating fluid supply line extending from said reservoir to said jet, to thereby gravity feed said lubricating fluid from said reservoir to said jet.

3. The aerial chain saw system as defined in claim 1 wherein:
   said flywheel is sufficiently sized to contact a landing surface thereby preventing the chain from contacting the landing surface when the saw is lowered into a horizontal position on the landing surface;
   a landing foot is attached opposite said flywheel at a right angle to said guide bar for supporting said chain saw above the landing surface, and
   a chain guard affixed to said second end of said saw bar such that said chain is protected from accidental dislodgement during landing and operation of the saw.

4. The aerial chain saw system as defined in claim 1 wherein:
   said aircraft is a helicopter with a hydraulic fluid pressure source;
   said at least one hydraulic motor has a non-conductive hydraulic fluid supply line and a non-conductive hydraulic fluid return line in cyclical fluid communication with said hydraulic fluid source; and
   non-conductive hydraulic fluid is used.

5. The system as defined in claim 4 wherein said hydraulic fluid pressure source is a hydraulic pump that is carried by said helicopter, but is not integral with said helicopter.

6. The system as defined in claim 4 wherein said hydraulic fluid pressure source is an integral part of said helicopter.

7. An aerial chain saw system comprising:
   a chain saw; and
   a non-rigid suspension means for attaching said chain saw to and insulating said chain saw from an aircraft, said non-rigid suspension means further comprising:
      a belly hook attached to an aircraft including a load beam for supporting a load;
      a non-twist member, of non-conductive material, for suspending said chain saw in an airborne position wherein said non-twist member has a first end piece attached onto a first end thereof, wherein said first end piece defines an aperture tolerance-fit for accepting said load beam therethrough to inhibit rotation of the saw about a vertical axis, while allowing for removal of the first end piece from the load beam and said non-twist member has a second end piece, defining at least one aperture, attached to a second end thereof for suspending said saw therefrom; and
   a means for attaching said chain saw to said second end of said non-twist member.

8. The aerial chain saw system as defined in claim 7, wherein said non-twist member comprises:
   two non-conductive fiberglass shafts;
   a hinged knuckle link interconnecting said fiberglass shafts such that said shafts pivot bidirectionally in the direction of the nose of the aircraft, for easing landing, and reducing shocks and vibrations transferred to the aircraft.

9. An aerial chain saw system comprising:
   a non-rigid suspension means comprising:
      a belly hook attached to an aircraft including a load beam for supporting a load;
      a non-twist member, of non-conductive material, for suspending said chain saw in an airborne position wherein said non-twist member has a first end piece attached onto a first end thereof, wherein said first end piece defines an aperture tolerance-fit for accepting said load beam therethrough to inhibit rotation of the saw about a vertical axis, while allowing for removal of the first end piece from the load beam and said non-twist member has a second end piece, defining at least one aperture, attached to a second end thereof for suspending a saw therefrom;
   a chain saw comprising:
      a singular cutting means comprising a continuous chain having teeth mounted thereto;
      a bar for guiding said chain about a periphery of said bar;
      a drive assembly for driving said chain about said periphery of said bar, said drive assembly comprising:
         a sprocket mounted at a first end of said bar for driving said chain about said periphery of said bar;
         at least one hydraulic motor for driving said first sprocket; and
         a flywheel assembly for storing inertial energy and stabilizing said chain;
      two lift plates attached to said first end of said bar of said saw and to said first end of said non-twist member, wherein said lift plates have at least one pin extending through at least one aperture in said end piece of said non-twist member; and
   a lubrication system including:
      a lubricating jet mounted above said drive assembly for applying a lubricating fluid to said chain;

a lubricating fluid reservoir mounted on said non-rigid suspension means above said chain saw; and a lubricating fluid supply line extending from said reservoir to said jet, to thereby gravity feed said lubricating fluid from said reservoir to said jet.

10. The aerial chain saw system as defined in claim 9, wherein said non-twist member comprises:

two fiberglass shafts;

a hinged knuckle link interconnecting said fiberglass shafts such that said shafts pivot in the direction of towards or away from the nose of the aircraft, for easing landing, and reducing shocks and vibrations transferred to the aircraft.

11. The aerial chain saw system as defined by claim 9 including an emergency jettison disconnect apparatus for severing and detaching said hydraulic fluid supply lines, and said hydraulic fluid return lines.

* * * * *